United States Patent [19]

Okayama et al.

[11] Patent Number: 5,684,728
[45] Date of Patent: Nov. 4, 1997

[54] DATA PROCESSING SYSTEM HAVING A SATURATION ARITHMETIC OPERATION FUNCTION

[75] Inventors: Sachiko Okayama; Hiroshi Katsuta, both of Tokyo, Japan

[73] Assignee: NEC Corporation, Tokyo, Japan

[21] Appl. No.: 489,622

[22] Filed: Jun. 12, 1995

[30] Foreign Application Priority Data

Jun. 10, 1994 [JP] Japan .................. 6-151799

[51] Int. Cl.$^6$ ............................................ G06F 7/38
[52] U.S. Cl. ............................................ 364/736.5
[58] Field of Search ........................ 364/736.5, 745

[56] References Cited

U.S. PATENT DOCUMENTS

| | | | |
|---|---|---|---|
| 4,589,087 | 5/1986 | Auslander | 364/768 |
| 4,945,507 | 7/1990 | Ishida et al. | 364/736.5 |
| 4,961,161 | 10/1990 | Kojima | 364/736.5 |
| 5,038,313 | 8/1991 | Kojima | 364/736.5 |
| 5,319,588 | 6/1994 | Haines et al. | 364/745 |
| 5,448,509 | 9/1995 | Lee et al. | 364/736.5 |
| 5,508,951 | 4/1996 | Ishikawa | 364/745 |

FOREIGN PATENT DOCUMENTS

| | | |
|---|---|---|
| 0 130 377 | 1/1985 | European Pat. Off. . |
| 58-115544 | 7/1983 | Japan . |

OTHER PUBLICATIONS

Guttag, "Built–in overflow detection speeds 16–bit µP arithmetic", 2119 E.D.N. Electrical Design News, vol. 28 (1983) Jan., No. 1, Boston, MA, USA, pp.133–135.

IBM Technical Disclosure Bulletin, vol. 24, No. 7A, Dec. 1981, pp. 3126–3127, W. R. Hedeman III: "Fixed point overflow exception detection".

*Primary Examiner*—David H. Malzann
*Attorney, Agent, or Firm*—Foley & Lardner

[57] ABSTRACT

A data processing system includes an instruction decoder for decoding a string of instructions including an arithmetic operation instruction, an arithmetic operation unit controlled by the instruction decoder for executing a designated arithmetic operation for a received data, the arithmetic operation unit outputting not only the result of the designated arithmetic operation, but also a sign information and an overflow/underflow information of the result of the designated arithmetic operation, and a saturation detecting circuit receiving the sign information and the overflow/underflow information for controlling a selector in such a manner that if an overflow has occurred when the sign information indicates the positive, the selector selects a positive maximum value; if an underflow has occurred when the sign information indicates the negative, the selector selects a negative maximum value; and if neither the overflow nor the underflow has occurred, the selector selects the result of arithmetic operation outputted from the arithmetic operation unit. Furthermore, if the overflow has occurred when the sign information indicates the positive, or if the underflow has occurred when the sign information indicates the negative, the saturation detecting circuit sets a saturation flag of a PSW indicative of existence/non-existence of a saturation processing. After the saturation flag is set, the saturation flag is reset by only execution of a data transfer instruction by the arithmetic operation unit.

11 Claims, 6 Drawing Sheets

DATA PROCESSING SYSTEM HAVING A SATURATION ARITHMETIC OPERATION FUNCTION

BACKGROUND OF THE INVENTION

1. Field of the Invention

The present invention relates to a data processing system, and more specifically to a data processing system having an arithmetic operation function for performing a modification processing after an overflow.

2. Description of Related Art

Saturation processing is a process for determining a maximum value or a minimum value which is a correct sign as the result of the arithmetic operation when an overflow or an underflow occurs in an arithmetic system, e.g., in the process of executing an cumulative summing and subtracting operation.

When an integer is expressed by a binary number in the form of a 2'compliment, for example, a 32-bit data having a sign information (sign bit) constituted of the most significant bit (MSB), can indicate a numerical value in a range from a negative minimum value "−1" expressed by FFFFFFFFH (suffix "H" indicates a hexadecimal notation in this specification) to a negative maximum value expressed by 800 00000H, and in another range from from a positive minimum value "0" expressed by 00000000H to a positive maximum value expressed by 7FFFFFFFH.

When the sign bit is "1", the data indicates a negative integer, and when the sign information is "0", the data indicates a positive integer.

When the sign bit is located at the MSB, for example, if the positive integer which is the result of the arithmetic operation overflows over the positive maximum value, at the moment a carry occurs from "7FFFFFFFH", the sign bit will change from "0" to "1". As a result, the result of the arithmetic operation which should be expressed as a positive integer, is expressed as a negative integer.

To the contrary, if the negative integer which is the result of the arithmetic operation underflows over the negative maximum value, at the moment a borrow occurs from "80000000H", the sign bit will change from "1" to "0". As a result, the result of the arithmetic operation which should be expressed as a negative integer, is expressed as a positive integer.

The result of the arithmetic operation which had caused a sign inversion as mentioned above, cannot be used for control, since it is inverted in sign from a correct result of arithmetic operation.

Therefore, when the result of the arithmetic operation exceeds the positive or negative maximum value, it has been so set that the result of the arithmetic operation becomes the maximum value in a correct sign. This has been called to "saturate" or a "saturation processing". In addition to arithmetic operation instructions, an instruction capable of performing the saturation processing is called as a "saturation arithmetic operation instruction".

In the prior art, for example, Japanese Patent Application Laid-open Publication No. JP-A-58-115544 proposed one example of an arithmetic system having a saturation arithmetic operation function for performing the saturation processing.

This proposed arithmetic system is configured to set an overflow flag and to modify the result of arithmetic operation to a positive or negative maximum value, when the result of arithmetic operation causes an overflow or an underflow.

Furthermore, there has been also proposed to provide a saturation arithmetic operation instruction for performing the saturation processing and an ordinary arithmetic operation instruction which does not perform the saturation processing, and to set a C bit (indicative of a carry, a borrow, an overflow, an underflow or a shift-out) and to modify the result of arithmetic operation to a positive or negative maximum value, if an overflow or an underflow occurs when the saturation arithmetic operation instruction has been executed. In this case, when the ordinary arithmetic operation instruction is executed, if an overflow or an underflow occurs, the C bit is set, but the result of arithmetic operation is maintained as it is.

Now, a construction and an operation of the conventional data processing system will be described with reference to the drawings.

Referring to FIG. 1, there is shown a typical example of the conventional arithmetic system having a saturation arithmetic operation instruction dedicated for performing the saturation processing. In FIG. 1, Reference Numeral 1 designates a 32-bit arithmetic and logic unit, and Reference Numeral 2 shows an instruction decoder for decoding various instructions (not shown) including the saturation arithmetic operation instruction, the ordinary arithmetic operation instruction, and others and for outputting an arithmetic operation command 35. Reference Numeral 3 indicates a saturation detecting circuit for detecting that the result of arithmetic operation is saturated, and Reference Numeral 4 shows a flag generator for setting the result of the instruction execution to a PSW (program status word) 9.

Furthermore, Reference Numeral 5 designates a CY flag indicating that a carry or a borrow has occurred in the result of the arithmetic operation, and Reference Numeral 7 shows a selector for selecting one of the result of arithmetic operation, a positive maximum value and a negative maximum value. In addition, Reference Numeral 9 is the PSW for recording the result of arithmetic operation in the ALU 1 and the status of the CPU, and Reference Numeral 8 is a data bus. Reference Numerals 10 to 16 designate an A register, a B register, a C register, a D register, an E register, an F register and a G register, respectively, which are a 32-bit registers and which constitute a general purpose register for storing various data used for a program execution. Reference Numeral 17 shows a L (left) register for giving one input of the ALU 1, and Reference Numeral 18 indicates a R (right) register for giving the other input of the ALU 1.

In accordance with the arithmetic operation command 35, the ALU 1 executes a designated arithmetic operation such as an addition, a subtraction, a multiplication and a division for data held in the L register 17 and data held in the R register 18. The ALU outputs the result of arithmetic operation to the selector 7, and also supplies the flag generator 4 with a status signal 30 (including information OV indicative of whether or not the result of arithmetic operation causes the overflow or the underflow), and another status signal 31 (including a sign information S of the result of arithmetic operation, a carry/borrow information C and information Z indicating whether or not the result of arithmetic operation is "0" (zero)).

The status signal 30 and the sign information S of the status signal 31 outputted from the ALU 1 are supplied to the saturation detecting circuit 3.

The instruction decoder 2 outputs the arithmetic operation command 35 to the saturation detecting circuit 3 and the flag generator 4. The arithmetic operation command 35 outputted to the flag generator 4 is composed of a signal activated when the instruction decoder 2 decodes the saturation arithmetic operation instruction.

The saturation detecting circuit 3 outputs to the flag generator 4 a status signal indicating that the saturation processing has been performed. In addition, the saturation detecting circuit 3 selectively activates selection signals 32, 33 and 34 for selecting the result of arithmetic operation.

On the basis of the selection signals 32, 33 and 34, the selector 7 selects one of the result of arithmetic operation outputted from the ALU 1, a positive maximum value and a negative maximum value, and outputs the selected one to the data bus 8.

On the basis of the status signals 30 and 31, the flag generator 4 outputs to the PSW 9 various flag control signals 37 for changing the status of a corresponding flag only when an instruction allowing a change of the corresponding flag is executed.

The A register 10 to the G register 16 supply data through the data bus 8 to the L register 17 and the R register 18. These 1, register 17 and R register 18 supply dam to the ALU 1.

Now, a detailed construction of the PSW 9 and the flag generator 4 will be described with reference to FIG. 2. In FIG. 2, elements corresponding to those shown in FIG. 1 are given the same Reference Numerals.

In FIG. 2, of the status signal 31 outputted from the, ALU 1 shown in FIG. 1, a status signal corresponding to the sign information S is expressed by "31-S", and a status signal corresponding to the carry/borrow signal C is expressed by "31-C". Furthermore, a status signal corresponding to the information Z indicating whether or not the result of arithmetic operation is "0" is expressed by "31-Z". in addition, to the arithmetic operation command 35 generated by the instruction decoder 2, the instruction decoder 2 supplies a signal to the flag generator 4 expressed as "35-SAT". Of the flag control signals 37 generated by the flag generator 4, a signal supplied to the CY flag 5 is indicated as a control signal 37-CY.

Each flag included in the PSW 9 is constituted of a D-type flipflop, which is controlled to hold data at an ending timing of each instruction.

The flag control signals 37 are supplied to an data input D of corresponding D-type flipflops, each of which constitutes one flag. Explaining the control signal 37-CY and the D-type flipflop constituting the CY flag 5, the control signal 37-CY outputted by the flag generator 4 is supplied to the data input D of the D-type flipflop constituting the CY flag 5.

The flag generator 4 includes a 2-input AND circuit 41 for generating a logical product (conjunction) between the status signal 36, indicating that the saturation processing has been executed, and the arithmetic operation command signal 35-SAT, another 2-input AND circuit 42 for generating a logical product between an output of the AND circuit 41 and the status signal 30, an inverter 45 generating an inverted signal of the arithmetic operation command signal 35-SAT, still another AND circuit 44 for generating a logical product between an output of the inverter 45 and the signal 31-C, and a 2-input OR circuit 43 for generating a logical sum (disjunction) between an output of the AND circuit 44 and an output of the AND circuit 44.

The status signal 36 is supplied to one input of the AND circuit 41, and the arithmetic operation command signal 35-SAT is supplied to the other input of the AND 41 and an input of the inverter 45. The signal 31-C and the output of the inverter 45 are supplied to a pair of inputs of the AND circuit 44. The output of the AND circuit 41 is connected to one input of the AND circuit 42. The status signed 30 is connected to the data input D of the D-type flipflop constituting the V flag in the PSW 9, and also to the other input of the AND circuit 42. The signal 31-S and the signal 31-Z are connected to respective data inputs D of the flip flops constituting the S flag and the Z flag in the PSW 9, respectively. An output of the OR circuit 43 is connected, as the signal 37-CY, to the data input D of the D-type flipflop constituting the CY flag in the PSW 9. Now, with reference to FIG. 1, an explanation will be given on when the saturation arithmetic operation instruction is executed.

First, the operation of the saturation processing, performed at the time of executing the saturation arithmetic operation instruction, will be described.

Under the arithmetic operation command 35 from the instruction decoder 2, data held in registers selected from the general purpose registers, including the A register 10 to the g register 16, is set in the L register 17 and the R register 18. The saturation detecting circuit 3 receives the status signals 30 and 31 from the ALU 1, and also controls the selector 7 by the selection signals 32, 33 and 34 so that in response to the overflow or the underflow, the selector 7 selects either the positive maximum value or the negative maximum value in accordance with a combination of logical values of the information OV and the sign information S.

More specifically, when there occurs the overflow resulting in the sign information S of "0" and the information OV of "1", the saturation detecting circuit 3 activates the selection signal 34 so that the selector 7 selects and outputs "7FFFFFFFH" to the data bus 8. In addition, the saturation detecting circuit 3 activates the status signal 36 indicating that the saturation processing has been performed. In addition, the flag generator 4 receives the status signal 36, and outputs the flag control signal 37 for indicating that the saturation processing has been performed, so that the CY flag 5 in the PSW 9 is set to "1".

Similarly, when there occurs the underflow resulting in the sign information S of "1" and the information OV of "1", the saturation detecting circuit 3 activates the selection signal 33 so that the selector 7 selects and outputs "80000000H" to the data bus 8. In addition, the saturation detecting circuit 3 activates the status signal 36 indicating that the saturation processing has been performed, and, the flag generator 4 receives the status signal 36, and outputs the flag control signal 37 for indicating that the saturation processing has been performed, so that the CY flag 5 in the PSW 9 is set to "1".

Furthermore, referring to FIG. 2, a detailed operation of the PSW 9 and the flag generator 4 when the saturation processing is performed at the time of executing the saturation arithmetic operation instruction, will be described.

At the time of executing the saturation arithmetic operation instruction, the arithmetic operation command signal 35-SAT outputted from the instruction decoder 2, is activated to "1" which indicates that instruction is the saturation arithmetic operation instruction. Since both of the status signal 36 and the signal 35-SAT are activated to "1", the output of the AND circuit 41 is brought to "1". In addition, the output of the inverter 45 is brought to "0", so that the output of the AND circuit 44 is brought to "0" regardless of the logical level of the signal 31-C. Since the status signal 30 of the information OV is "1", the output of the AND circuit 42 is brought to "1". Accordingly, the output 37-CY of the OR circuit 43 is brought to "1", so that the CY flag 5 is set to "1".

Referring to FIG. 1, again, operation when neither the overflow nor the under flow occurs at the time of executing the saturation arithmetic operation instruction, namely, in the case Of the information OV of "0", will be described. In this situation, the saturation processing is not performed, so that the result of arithmetic operation is outputted through the selector 7 to the data bus 8.

Namely, the saturation circuit 3 activates the signal 32 to cause the selector 7 to output the result of arithmetic operation in the ALU 7. Since the saturation processing is not performed, the status signal 36 is inactivated, so that the flag generator 4 outputs the flag control signal 37 so as to clear the CY flag 5 in the PSW 9 to "0" in order to indicate that the saturation processing has not been performed.

Furthermore, referring to FIG. 2, a detailed operation of the PSW 9 and the flag generator 4 when the saturation processing is not performed at the time of executing the saturation arithmetic operation instruction, will be described.

When the saturation arithmetic operation instruction is executed, the arithmetic operation command signal 35-SAT outputted from the instruction decoder 2, is activated to "1" which indicates that the instruction is the saturation arithmetic operation instruction. Since the saturation processing is not performed, the status signal 36 is inactivated to "0". Accordingly, although the signal 35-SAT is active, the output of the AND circuit 41 is at "0". In addition, the output of the inverter 45 for inverting the arithmetic operation command signal 35-SAT, is brought to "0", so that the output of the AND circuit 44 is brought to "0" regardless of the logical level of the signal 31-C. Since the output of the AND circuit 41 is at "0", the output of the AND circuit 42 is brought to "0" regardless of the logical level of the status signal 30. Accordingly, the output 37-CY of the OR circuit 43 is brought to "0", so that the CY flag 5 is set to "0".

The following TABLE 1 indicates a relation between the selection by the saturation detecting circuit 3 and the status of the CY flag 5. As seen from TABLE 1, the CY flag 5 is not set to "1" in response to generation of the carry or borrow. Namely, the CY flag 5 is not set to "1" on the basis of the fact that the saturation processing has been performed.

carry or the borrow occurs in the result of arithmetic operation, the flag generator 4 outputs the flag control signal 37 to set the CY flag 5 in the PSW 9 to "1". If neither the carry nor the borrow occurs, the flag generator 4 clears the CY flag 5 to "0".

Referring to FIG. 2, again, a detailed operation of the PSW 9 and the flag generator 4 when the ordinary arithmetic operation instruction with no saturation processing is not performed, will be described.

Since the saturation arithmetic operation instruction is not executed, both of the status signal 36 and the arithmetic operation command signal 35-SAT are inactivated to "0". Therefore, the output of the AND circuit 41 is at "0", and the output of the inverter 45 is at "1", so that the logical level of the signal 31-C becomes the output of the AND circuit 44 without modification. In addition, since the output of the AND circuit 41 is at "0", the output of the AND circuit 42 is brought to "0" regardless of the logical level of the status signal 30. Accordingly, the output 37-CY of the OR circuit 43 becomes equal to the logical level of the signal 31-C, so that the CY flag 5 in the PSW 9 is either set to "1" or cleared to "0" in response to the existence/non-existence of the carry or borrow in the result of arithmetic operation of the ALU 1.

The typical example of the conventional arithmetic system capable of performing the saturation processing has been constructed as mentioned above. Namely, if the saturation processing has been performed, the CY flag 5 is set to "1", so that just after the saturation processing has been performed, by investigating the CY flag 5 in a software manner, it is possible to know that the saturation processing has been performed.

However, if the CY flag 5 is not investigated just after the saturation processing has been performed, the CY flag 5 may be cleared to "0" in the execution of its succeeding arithmetic operation This is considered that, because the CY flag (which reflects one after another and in real time the result of arithmetic operations in the ALU 1 when ordinary arithmetic operation instructions are executed) is used as a flag showing the saturation processing, even if the fact that the saturation processing has been performed is stored in the CY flag 5, the storing will be extinguished by an ordinary

TABLE 1

| RESULT OF ARITHMETIC | SELECTION BY SATURATION DETECTING CIRCUIT 3 AND STATUS OF CY FLAG 5 | | | STATUS OF CY |
|---|---|---|---|---|
| | FROM ALU 1 | | SELECTION BY SATURATION | |
| OPERATION | S | OV | DETECTING CIRCUIT 3 | FLAG 5 |
| EXCEEDS POSITIVE MAX VALUE | 0 | 1 | 7 F F F F F F F H | 1 |
| EXCEEDS NEGATIVE MAX VALUE | 1 | 1 | 8 0 0 0 0 0 0 0 H | 1 |
| THE OTHERS | 0/1 | 0 | RESULT OF ARITHMETIC OPERATION IN ALU 1 | 0 |

Again referring to FIG. 1, an operation when the ordinary arithmetic operation instruction with no saturation processing is performed, will be explained.

In the ordinary arithmetic operation instruction with no saturation processing, the saturation detecting circuit 2 is controlled to activate the signal 32 so that selector 7 always outputs the result of arithmetic operation of the ALU 1. Since no saturation processing is performed, the status signal 36 is always inactive, and on the other hand, when the arithmetic operation instruction executed after the saturation arithmetic operation instruction.

In the following, this will be explained in detail with reference to a specific example of a cumulative summing in a predictive filter in a system for setting the revolution number of an electric motor.

In such a system, when the revolution number of the motor is elevated to a desired revolution number, the revolution number is set while predicting a future revolution number. For example, the future revolution number is predicted by a cumulative summing expressed for example in the following equation (1)

$$Vn+1 = \alpha * Vn + \beta * Vn-1 + \gamma * Vn-2 \quad (1)$$

where Vn is a current revolution number; Vn−1 is the revolution number before one period; Vn−2 is the revolution number before two periods.

The revolution number Vn+1 in a next period is predicted by multiplying the revolution numbers in the past by constants α,β and γ and summing the multiplied revolution numbers.

Here, the constants α, β and γ are set to be able to be discriminated on the basis of whether or not the result of arithmetic operation based on real parameters in each item exceeds the integer arithmetic operation range of $-2^{23}$ to $+2^{23}$ in the 32-bit ALU 1.

If a difference between the calculated revolution number Vn+1 and the desired revolution number is "0" (zero), the setting of the revolution number is completed. If there is a difference between the calculated revolution number Vn+1 and the desired revolution number, a time of a driving pulse for controlling the revolution number of the motor is changed. By repeatedly obtaining the difference between the calculated revolution number Vn+1 and the desired revolution number, the setting of the revolution number is maintained until the difference between the calculated revolution number Vn+1 and the desired revolution number becomes "0" (zero).

In the above mentioned step of calculating the revolution number by the cumulative summing, if the result of the summing in each item in the process of the cumulative summing is frequently saturated, it is considered to be because of deterioration with age of the motor and/or other causes, and the constants α, β and γ in the respective items are modified.

In this case, since the conventional arithmetic system is so configured that when the saturation processing has been performed, the CY flag is set to "1" and the saturation processing has not been performed, the CY flag is set to "0", if the status of the CY flag is not memorized just after the saturation processing has been performed, there is a fear that the CY flag is cleared in a next arithmetic operation. Because of this, generation of the saturation in the course of the arithmetic operation may not be detected.

Here, operation of the saturation processing will be described with reference to FIG. 3 which is a flow chart illustrating the saturation processing in the conventional arithmetic operation.

Here, it is assumed that the constants α, β and γ are previously stored in the A register 10, the B register 11 and the C register 12 in the arithmetic system shown in FIG. 1, respectively, and the revolution numbers Vn, Vn−1 and Vn−2 are also previously stored in the D register 13, the E register 14 and the F register 15, respectively. In addition, the G register 16 is used for store the fact that the saturation processing has been performed.

First, for initialization, the G register 16 is set to "0" (Step 200). And, α * Vn is calculated (Step 201) and β * Vn−1 is calculated (Step 202).

By the saturation arithmetic operation instruction, a sum of the values obtained in the Steps 201 and 202, namely, α * Vn+β * Vn−1 is calculated (Step 203).

Then, whether or not the saturation processing has been performed for the result of arithmetic operation in Step 203, is discriminated by referring to the CY flag 5 (Step 204). If the CY flag 5 is "1", "1" is set to the G register so as to indicate that the saturation processing has been performed (Step 205).

Thereafter, γ* Vn−2 is calculated (Step 206), and a sum of the values obtained in the Steps 203 and 206, namely, α*Vn+β*Vn−1+γ* Vn−2 is calculated (Step 207).

Furthermore, whether or not the saturation processing has been performed for the result of arithmetic operation in Step 207, is discriminated by referring to the CY flag 5 (Step 208).

If the CY flag 5 is "1", "1" is set to the G register so as to indicate that the saturation processing has been performed (Step 209).

The above mentioned processing shown in FIG. 3 in the case that an actual operation is executed using the general purpose registers in the arithmetic system shown in FIG. 1, and the saturation processing is performed in the Step 203 and the processing in Step 207 is not saturated, will be now explained. Incidentally, FIG. 3 additionally shows the status of the CY flag 5 and the status of the G register 16 which are changed with the progress of the processing.

In Step 200, the G register 16 is set "0", and in Step 201, a product between the A register 10 and the D register 13 is stored in the D register 13. In Step 202, a product between the B register 11 and the E register 14 is stored in the E register 14.

In Step 203, a sum of the D register 11 and the E register 14 is calculated, and in this case, the saturation processing is performed and its result is stored in the E register 14. Accordingly, the CY flag 5 is set to "∓1".

In Step 204, the CY flag 5 is discriminated. Since the CY flag 5 is at "1", the G register 16 is set to "1" in Step 205.

Thereafter, in Step 206, a product between the C register 12 and the F register 15 is stored in the F register 15.

In Step 207, a sum of the E register 14 and the F register 15 is calculated, and stored in the F register 15 without performing the saturation processing. In this case, accordingly, the CY flag 5 is reset to "0".

In Step 208, the CY flag 5 is discriminated. Since it is discriminated that the CY flag 5 is at "0", the processing flow is ended.

In the above mentioned example, since the result of arithmetic was saturated in Step 203, the CY flag 5 was set to "1", but since the result of arithmetic was not saturated in Step 207, the CY flag 5 was brought to "0". At this time, the information of the saturation processing in the CY flag 5 is invalidated.

On the other hand, since the fact that the result of arithmetic was saturated in Step 203, is memorized in the G register 16 in the step 205, the information indicating that the saturation processing has been performed, is held regardless of whether or not the saturation processing has been performed after the step 203.

As mentioned above, the conventional arithmetic system is so configured that when the positive result of arithmetic operation in the ALU 1 causes an overflow, namely exceeds "7FFFFFFFH", the saturation processing is performed, and thereafter, the CY flag 5 is set to "1", and on the other hand, when the result of arithmetic operation is equal to or less than "7FFFFFFFH", the CY flag 5 is reset to "0".

Therefore, in order to discriminate whether or not the result of arithmetic operation of the predicted revolution number has been saturated, by checking the CY flag 5, there, are required the processing for discriminating whether or not the saturation processing has been performed, just after each saturation arithmetic operation, as shown in Step 204 and Step 208 in FIG. 3, and the processing for memorizing the fact that the saturation processing has been performed, as in Step 205 and in Step 209.

As seen from FIG. 3, in setting the revolution number of the motor which is rotating at a high speed, four of ten steps are overhead expended for the discrimination of the saturation processing and the memorization. This gives an adverse influence on realizing a high precision and a high speed of the revolution number control. In addition, in order to memorize whether or not the sanitation processing has been performed, it has been required to use the general purpose register of the arithmetic system.

SUMMARY OF THE INVENTION

Accordingly, it is an object of the present invention to provide an arithmetic system which has overcome the above mentioned defect of conventional devices.

Another object of the present invention is to provide an arithmetic system having a saturation processing function, but making unnecessary the overhead, including discriminating whether or not the saturation processing has been performed just after each saturation arithmetic operation instruction, and memorizing the fact that the saturation processing has been performed.

The above and other objects of the present invention are achieved in accordance with the present invention by a data processing system including an arithmetic operation means and a memory means including at least one flag indicating the status of the result of arithmetic operation performed in the arithmetic operation means, the memory means including at least a second flag for storing existence/non-existence of the saturation processing, the second flag being reset by execution of a predetermined instruction for resetting the second flag.

In one embodiment, after the second flag for storing existence/non-existence of the saturation processing, is set in response to execution of the saturation processing, and is maintained in a set condition until the predetermined instruction for resetting the second flag is executed.

Alternatively, the data processing system in accordance with the present invention further includes a detecting means receiving information indicative of execution of a saturation arithmetic operation instruction and a signal indicative of existence/non-existence of an overflow and another signal indicative of a sign, both outputted from the arithmetic operation means, the detecting means detecting the saturation processing, so that when the detecting means detects the saturation processing, the second flag for storing existence/non-existence of the saturation processing, is set.

Preferably, the second flag for storing existence/non-existence of the saturation processing, is formed of a RS flip flop having a reset input activated by execution of the predetermined instruction.

With the above mentioned arrangement, when an overflow has occurred and the result of arithmetic operation is positive, or when an underflow has occurred and the result of arithmetic operation is negative, the second flag indicative of existence/non-existence of a saturation processing is set. After the saturation flag is set, the saturation flag is reset by only execution of a data transfer instruction by the arithmetic operation unit. Accordingly, the overhead for discriminating whether or not the saturation processing has been performed just before the execution of the saturation arithmetic operation instruction, and then for memorizing the fact that the saturation processing has been performed, becomes unnecessary. Thus, it is possible to realize a high precision and a high speed of the data processing system. In addition, it is no longer necessary to use the general purpose register of the arithmetic system in order to memorize whether or not the saturation processing has been performed.

The above and other objects, features and advantages of the present invention will be apparent from the following description of preferred embodiments of the invention with reference to the accompanying drawings.

DESCRIPTION OF THE PREFERRED EMBODIMENTS

Figure 1:
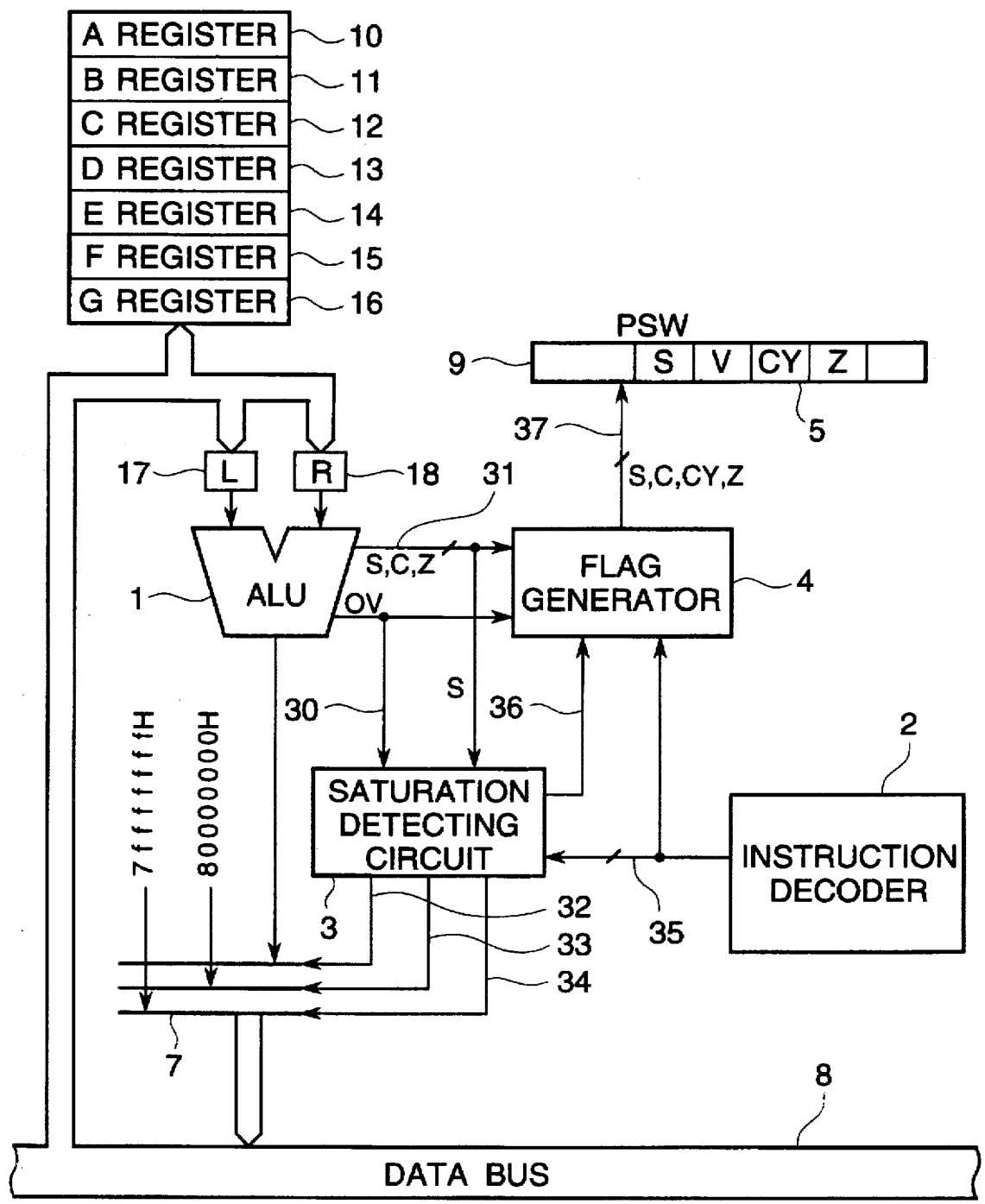
FIG. 1 is a block diagram of a conventional data processing system having a saturation processing function.
Figure 4:
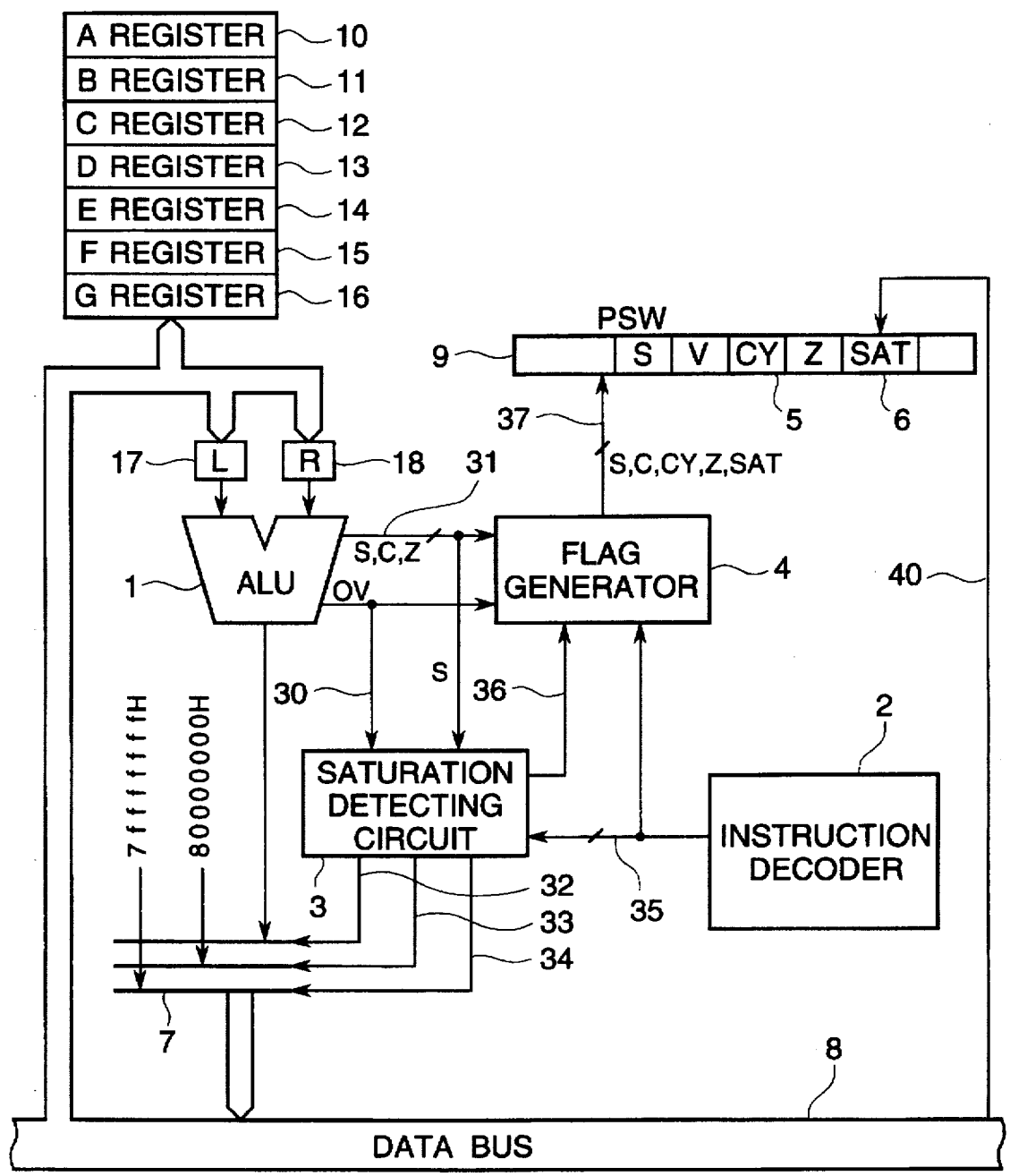
FIG. 4 is a block diagram of an embodiment of the data processing system in accordance with the present invention having a saturation processing function.

Referring to FIG. 4, there is shown a block diagram of an embodiment of the data processing system in accordance with the present invention having a saturation processing function. In FIG. 4, element similar to those shown in FIG. 1 are given the same Reference Numerals, and explanation thereof will be omitted so that only features of the data processing system shown in FIG. 4 different from the conventional one shown in FIG. 1 will be described for simplification of the description.

In the embodiment shown in FIG. 4, when a saturation processing has been performed in accordance with a saturation arithmetic operation instruction, the flag generator 4 sets a SAT (saturation) flag 6 in the PSW 9 to "1", in place of the CY flag 5.

The SAT flag 6 is connected to a data line 40 which is one bit of the data bus 8, so that the SAT flag 6 is cleared to "0" by execution of an instruction for transferring "0" to the SAT flag 6 under a control of a controller (not shown) of the dam processing system.

Figure 5:
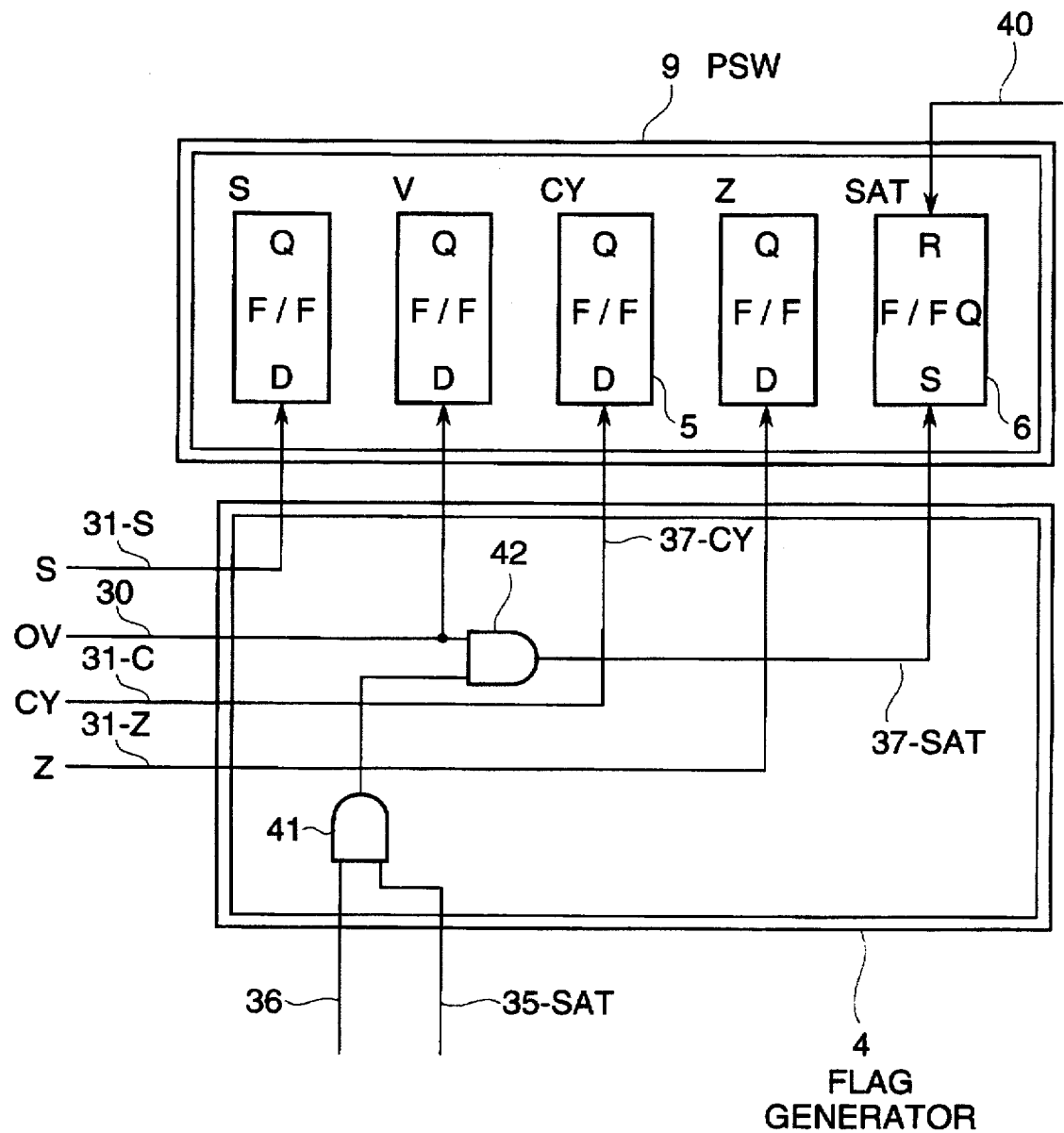
FIG. 5 is a logic diagram of the PSW and the flag generator used in the data processing system shown in FIG. 4.

Now, a detailed construction of the PSW 9 and the flag generator 4 of the shown embodiment will be described with reference to FIG. 5. In FIG. 5, elements corresponding to those shown in FIG. 2 are given the same Reference Numerals, and explanation thereof will be omitted.

As shown in FIG. 5, the PSW 9 of the shown embodiment newly provides the SAT flag 6 for holding the existence/non-existence of the saturation, and the SAT flag 6 is constituted of a RS (reset-set type) flipflop. A set terminal S of the RS flip flop constituting the SAT flag 6 is connected to receive the signal 37-SAT supplied from the flag generator 4. When the signal 37-SAT is at "1", the RS flipflop 6 is set to "1".

The data line 40 is connected to a reset input R of the RS flipflop 6 as a clear signal for the SAT flag 6. When the clear signal 40 for the SAT flag 6 is at "1", the RS flipflop 6 is reset to "0".

Figure 2:
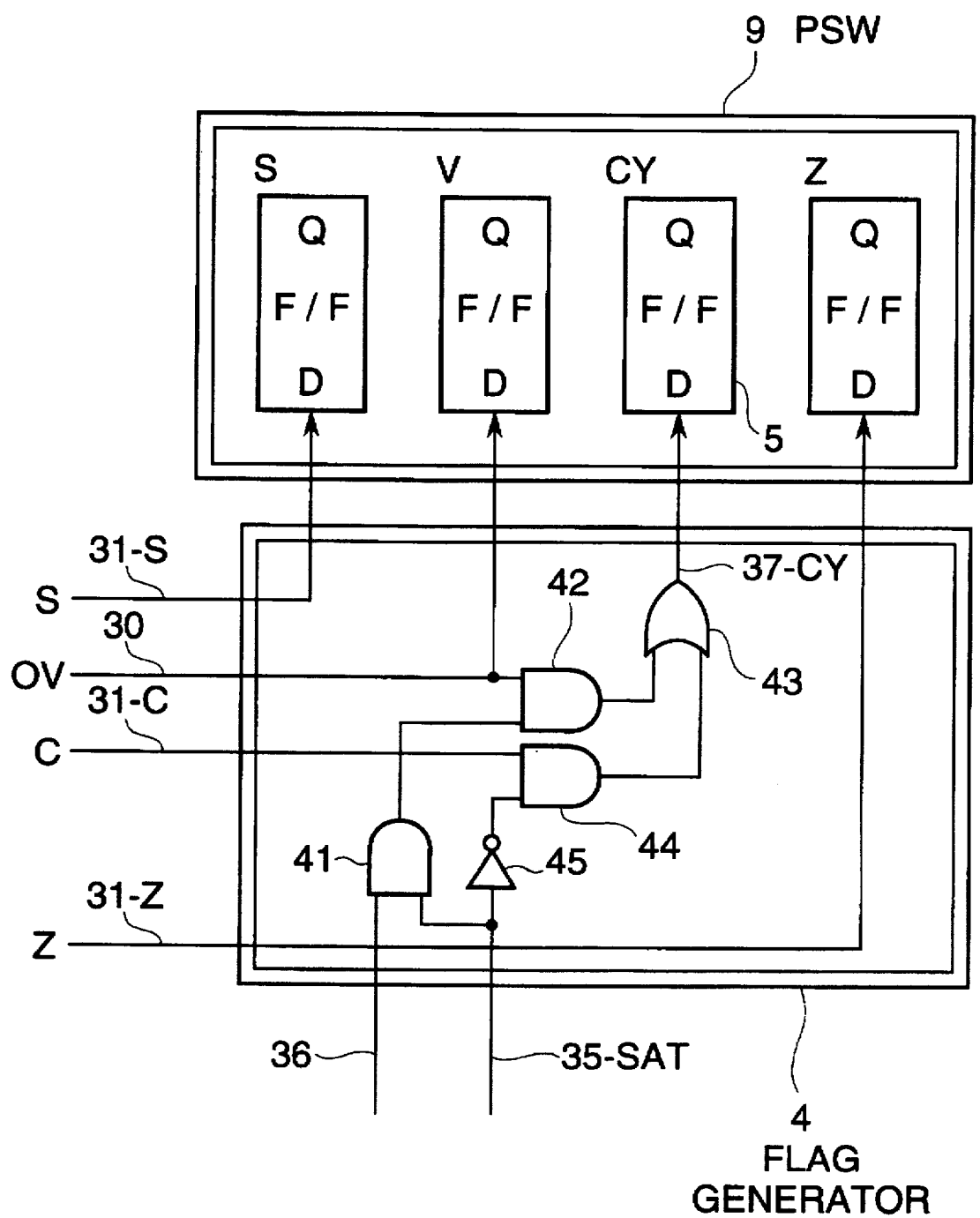
FIG. 2 is a logic diagram of the PSW and the flag generator used in the conventional data processing system shown in FIG. 1.
Figure 3:
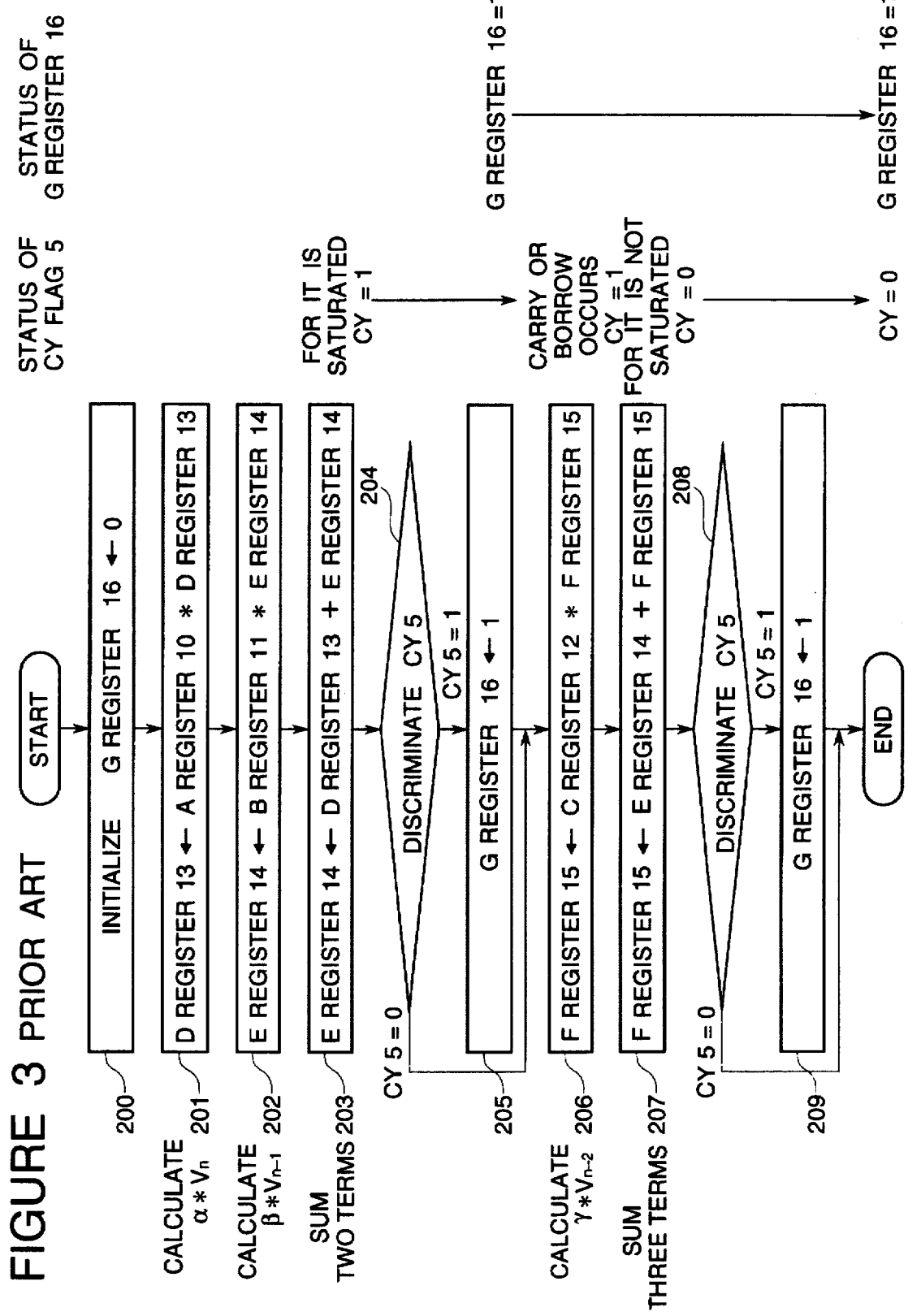
FIG. 3 is a flow chart illustrating the saturation processing in the conventional arithmetic operation shown in FIG. 1.

As shown in FIG. 3, furthermore, the flag generator 4 includes only the AND circuits 41 and 42 of the various logic circuits included in the conventional flag generator shown in FIG. 2. The output of the AND circuit 42 is connected to the SAT flag 6 as the signal 37-SAT, and the status signal 31-C is supplied as it is to the CY flag 5 of the PSW 9.

Operation when the saturation arithmetic operation instruction is executed, Will be described with reference to FIG. 5.

First, a detailed operation of the PSW 9 and the flag generator 4 when the saturation processing is performed at the time of executing the saturation arithmetic operation instruction, will be described.

At the time of executing the saturation arithmetic operation instruction, the arithmetic operation command signal 35-SAT outputted from the instruction decoder 2, is activated to "1" which indicates that the instruction is the saturation arithmetic operation instruction. Since both of the status signal 36 indicating that the saturation processing has been performed, and the signal 35-SAT are active, namely "1", the output of the AND circuit 41 is brought to "1". Since the status signal 30 of the information OV is "1", the control signal 37-SAT is brought to "1", so that the SAT flag 6 is set to "1".

Next, a detailed operation of the PSW 9 and the flag generator 4 when the saturation processing has not been preformed at the time of executing the saturation arithmetic operation instruction, will be described. When the saturation arithmetic operation instruction is executed, the arithmetic operation command signal 35-SAT is activated to "1". On the other hand, Since the saturation processing is not performed, the status signal 36 is inactivated to "0", so that the output of the AND circuit 41 becomes "0". Since the one input of the AND circuit 42 is at "0", the control signal 37-SAT outputted from the AND circuit 42 is brought to "0" regardless of the logical level of the status signal 30 (information OV), so that the SAT flag 6 continues to maintain its previous information.

The following TABLE 2 shows a relation between the selection by the saturation detecting circuit 3 and the status of the SAT flag 6.

operation instruction with no saturation processing is not performed, will Be described.

Since the saturation arithmetic operation instruction is not executed, both of the status signal 36 and the arithmetic operation command signal 35-SAT are inactivated to "0". Therefore, the output of the AND circuit 41 is at "0". Since the output of the AND circuit 41 is at "0", the control signal 37-SAT is brought to "0" regardless of the logical level of the status signal 30. Accordingly, the SAT flag 6 continues to maintain its previous information.

Now, explanation will be made on a case that the shown embodiment is used in the predicting filter, similarly to the conventional example explained hereinbefore.

Figure 6:
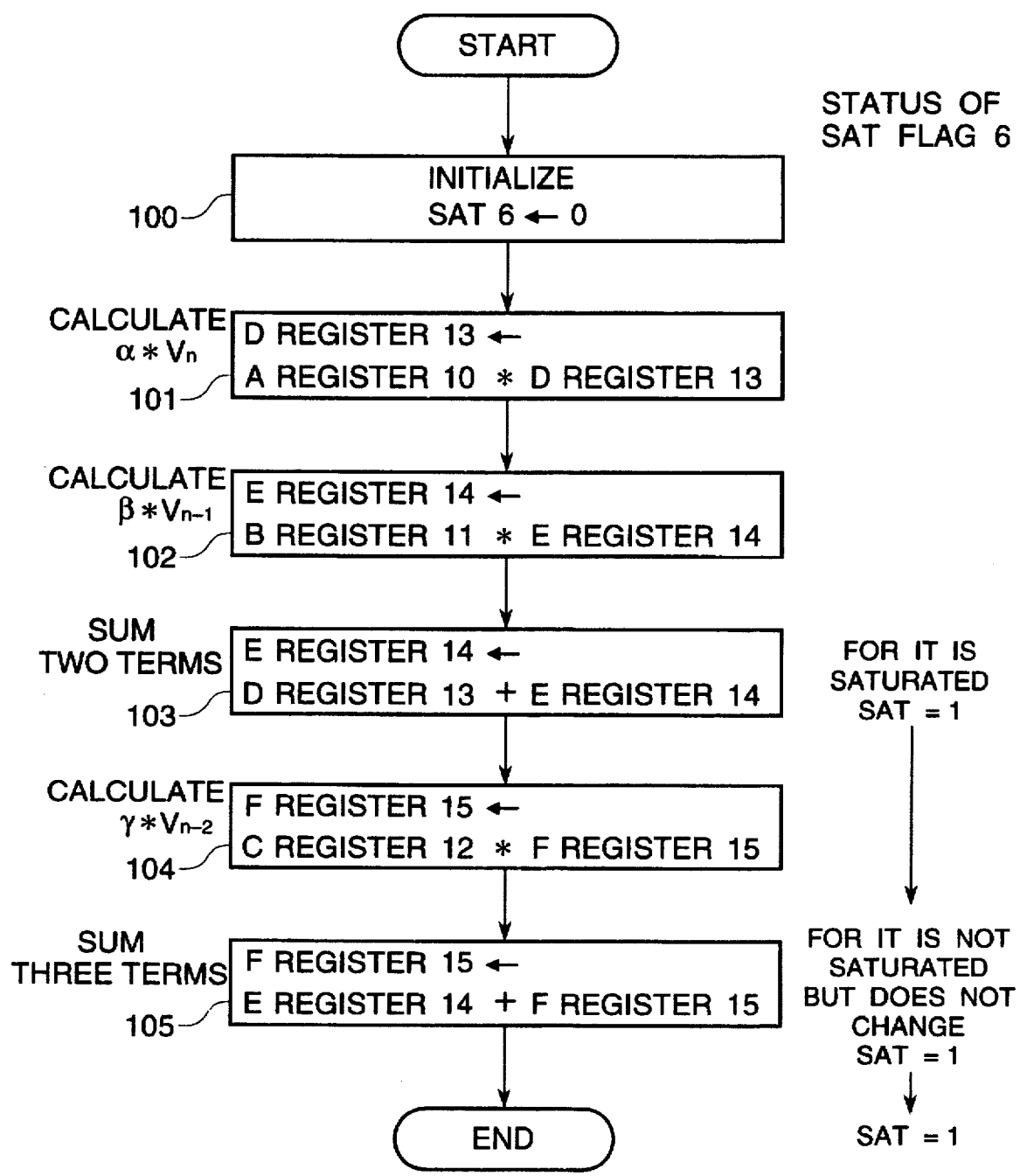
FIG. 6 is a flow chart illustrating the saturation processing in the arithmetic operation shown in FIG. 4.

Referring to FIG. 6, there is shown a flow chart illustrating the saturation processing in the arithmetic operation in the shown embodiment of the data processing system. With reference to FIG. 6, a process until the result of the cumulative summing is obtained, similarly to the conventional example, will be described.

Here, it is assumed that the constants $\alpha$, $\beta$ and $\gamma$ are previously stored in the A register 10, the B register 11 and the C register 12 in the arithmetic system shown in FIG. 4, respectively, and the revolution numbers Vn, Vn−1 and Vn−2 are also previously stored in the D register 13, the E register 14 and the F register 15, respectively. In the shown embodiment, however, the G register 16 is not used.

First, for initialization, the SAT flag 6 is set to "0" (Step 100). And, $\alpha^*$ Vn is calculated (Step 1ot) and $\beta^*$ Vn−1 is calculated (Step 102).

By the saturation arithmetic operation instruction, a sum of the values obtained in the Steps 101 and 102, namely, $\alpha^*Vn+\beta^*$ Vn−1 is calculated (Step 103). Furthermore, $\gamma^*Vn-2$ is calculated (Step 104). By the saturation arithmetic operation instruction, a sum of the values obtained in the Steps 103 and 104, namely, $\alpha^*Vn+\beta^*$ Vn−1+$\gamma^*$ Vn−2 is calculated (Step 105).

Here, the above mentioned processing shown in FIG. 6 in the case that an actual operation is executed using the general purpose registers in the arithmetic system shown in FIG. 4, and the saturation processing is performed in the Step 103 and the processing in Step 105 is not saturated, will be explained. Incidentally, FIG. 6 additionally shows the

TABLE 2

| RESULT OF ARITHMETIC | SELECTION BY SATURATION DETECTING CIRCUIT 3 AND STATUS OF SAT FLAG 6 | | | STATUS |
|---|---|---|---|---|
| | FROM ALU 1 | | SELECTION BY SATURATION | OF SAT |
| OPERATION | S | OV | DETECTING CIRCUIT 3 | FLAG 6 |
| EXCEEDS POSITIVE MAX VALUE | 0 | 1 | 7 F F F F F F F H | 1 |
| EXCEEDS NEGATIVE MAX VALUE | 1 | 1 | 8 0 0 0 0 0 0 0 H | 1 |
| THE OTHERS | 0/1 | 0 | RESULT OF ARITHMETIC OPERATION IN ALU 1 | NOT CHANGE |

In the data processing system shown in FIG. 4, the operation when an ordinary arithmetic operation instruction with no saturation processing is executed, is substantially the same as the corresponding operation of the conventional example explained hereinbefore.

Referring to FIG. 5, again, a detailed operation of the PSW 9 and the flag generator 4 when the ordinary arithmetic status of the SAT flag 6 which is changed with the progress of the processing.

In Step 100, the SAT flag 6 is set "0", and in Step 101, a product between the A register 10 and the D register 13 is stored in the D register 13. In Step 102, a product between the B register 11 and the E register 14 is stored in the E register 14.

In Step 103, a sum of the D register 11 and the E register 14 is calculated, and in this case, the saturation processing is performed and its result is stored in the E register 14. At this time, the SAT flag 6 is set to "1".

In Step 104, a product between the C register 12 and the F register 15 is stored in the F register 15.

In Step 105, a sum of the E register 14 and the F register 15 is calculated, and stored in the F register 15 without performing the saturation processing. At this time, the SAT flag 6 remains in the set condition of "1". Namely, the SAT flag 6 does not change, and the processing flow is ended.

In the above mentioned embodiment, the fact that the saturation processing has been performed in Step 103, is stored by setting the SAT flag 6 to "1", and in the case that the saturation processing is not performed in its succeeding processing; the SAT flag 6 is not cleared, and therefore, the information indicative of the fact that the saturation processing was performed, is held.

As seen from the above, in setting the revolution number of the motor which is rotating at a high speed similarly to the situation of the conventional example shown in FIG. 3, the steps expended for the discrimination of the saturation processing and the memorization (which were required in the conventional example) are completely omitted from the steps of the processing used for controlling a limit value. In other words, the ten steps in total required in the conventional example are reduced to six steps. Accordingly, the overhead which occupied about 40% of the total processing time in the conventional example, is removed by only adding the very simple flag function, and it is possible to realize a high precision and a high speed of the revolution number control.

In the above mentioned embodiment, after the SAT flag for storing whether or not the saturation processing has been performed, is set once, the SAT flag is in no way cleared by the result of succeeding arithmetic operations, until a predetermined instruction is executed to reset the SAT flag. Therefore, it is sufficient if the discrimination as to whether or not the saturation processing was performed, is carried out at an end of all cumulative summing operations In addition, in order to memorize whether or not the saturation processing has been performed, the shown embodiment does not require to use the general purpose register of the arithmetic system. In other words, the G register 16 used for memorizing whether or not the saturation processing has been performed in the conventional example explained hereinbefore, can be used for another purpose, for example, for storing another data. Therefore, the hardware resource of the data processing system can be effectively utilized.

The invention has thus been shown and described with reference to the specific embodiment in which the present invention was applied to cumulative summing for the control of the revolution number of the motor has been described. However, it should be noted that the present invention is in no way limited to the details of the illustrated structures but changes and modifications may be made within the scope of the appended claims. If the present invention is applied to various applications, it is possible to reduce the overhead in the various applications.

We claim:

1. A data processing system including:
   an instruction decoder for decoding a plurality of instructions including an ordinary arithmetic operation instruction and a saturation arithmetic operation instruction, said instruction decoder activating a specific arithmetic operation command signal when said saturation arithmetic operation instruction is executed,
   an arithmetic operation unit controlled by said instruction decoder for executing a designated arithmetic operation for a received data, said arithmetic operation unit outputting not only a result of the designated arithmetic operation, but also at least a sign information, a carry/borrow information, and an overflow/underflow information of the result of the designated arithmetic operation,
   a selector for selectively outputting one of the result of the designated arithmetic operation, a positive maximum value, and a negative maximum value in accordance with a selection signal,
   a saturation detecting circuit receiving said sign information and said overflow/underflow information for providing the selection signal to said selector, wherein said selection signal corresponds to:
   (A) a first processing if an overflow has occurred when said sign information indicates positive, wherein said selector selects the positive maximum value;
   (B) a second processing if an underflow has occurred when said sign information indicates negative, wherein said selector selects the negative maximum value; and
   (C) a third processing if neither the overflow nor the underflow has occurred, wherein said selector selects the result of the designated arithmetic operation outputted from said arithmetic operation unit,
   wherein said first and second processing constitute a saturation arithmetic operation processing, said saturation detecting circuit operating to activate a saturation processing status signal when said saturation processing has been performed,
   a program status word including at least a carry/borrow flag for indicating that a carry or a borrow has occurred in the result of the arithmetic operation, and a saturation flag for indicating an existence or non-existence of said saturation processing, said saturation flag being independent of said carry/borrow flag, and
   a flag generator receiving said carry/borrow information and said overflow/underflow information from said arithmetic operation unit and said specific arithmetic operation command signal and said saturation processing status signal, said flag generator being coupled to said program status word to set said carry/borrow flag when said carry/borrow information is active and also to set said saturation flag when said overflow/underflow information is active in the case that said specific arithmetic operation command signal and said saturation processing status signal are active, said flag generator operating to not set said saturation flag if at least one of said specific arithmetic operation command signal and said saturation processing status signal is inactive, even if said overflow/underflow signal is active, and said saturation flag being reset by only execution of a predetermined instruction by said arithmetic operation unit, after said saturation flag is set.

2. A data processing system as claimed in claim 1, wherein said predetermined instruction is a data transfer instruction.

3. A data processing system as claimed in claim 2, wherein said saturation flag comprises an RS flipflop having a reset input activated by execution of said data transfer instruction.

4. A data processing system comprising:
   an instruction decoder for decoding a plurality of instructions, wherein said plurality of instructions include an ordinary arithmetic instruction and a saturation arithmetic instruction, and wherein the instruction decoder activates and outputs a saturation arithmetic instruction signal when the saturation arithmetic instruction is decoded;

an arithmetic operation unit, controlled by the instruction decoder, for executing an arithmetic operation and for outputting a result of the arithmetic operation and an arithmetic information signal;

a saturation detecting circuit for selectively activating and outputting a saturation processing signal, and for selecting between a positive maximum value, a negative maximum value, and the result of the arithmetic operation, based on the arithmetic information signal;

a program status word including a plurality of flags, wherein the plurality of flags include a carry/borrow flag and a saturation flag; and a flag generator for setting the plurality of flags of the program status word based on the arithmetic information signal, the saturation arithmetic instruction signal, and the saturation processing signal, wherein once the saturation flag is set, reset of the saturation flag only occurs upon execution of a predetermined instruction from the plurality of instructions.

5. A data processing system according to claim 4, wherein the arithmetic information signal comprises a sign signal, a carry/borrow signal, and an overflow/underflow signal.

6. A data processing system according to claim 5, wherein the saturation detecting circuit selects:

(i) the positive maximum value when the sign signal indicates an overflow by the arithmetic operation;

(ii) the negative maximum value when the sign signal indicates an underflow by the arithmetic operation; and (iii) the result of the arithmetic operation otherwise.

7. A data processing system according to claim 5, wherein the saturation flag is set if:

(i) the overflow/underflow signal indicates an overflow or an underflow;

(ii) the saturation processing signal is active; and (iii) the saturation arithmetic instruction signal is active.

8. A data processing system according to claim 4, wherein the saturation processing signal is activated when the saturation detection circuit detects saturation processing.

9. A data processing system according to claim 4, wherein the saturation flag comprises an output of a RS flip-flop.

10. A data processing system according to claim 4, wherein the predetermined instruction is a data transfer instruction.

11. A method for setting a plurality of flags in a program status word, wherein the plurality of flags include a carry/borrow flag and a saturation flag, the method comprising the steps of:

decoding a plurality of instructions, wherein said plurality of instructions include an ordinary arithmetic instruction and a saturation arithmetic instruction;

activating a saturation arithmetic instruction signal when the saturation arithmetic instruction is decoded;

executing an arithmetic operation;

outputting a result of the arithmetic operation and a arithmetic information signal, wherein the arithmetic information signal comprises a sign signal, a carry/borrow signal, and an overflow/underflow signal;

selecting between a positive maximum value, a negative maximum value, and the result of the arithmetic operation, based on the arithmetic information signal;

selectively activating a saturation processing signal when the selection of the positive maximum value or the negative maximum value occurs;

setting the saturation flag if (i) the overflow/underflow signal indicates an overflow or an underflow, (ii) the saturation processing signal is active, and (iii) the saturation arithmetic instruction signal is active, wherein reset of the saturation flag only occurs upon execution of a predetermined instruction from the plurality of instructions; and setting the other flags of the plurality of flags of the program status word based on the arithmetic information signal.

* * * * *